US012808544B2

(12) United States Patent
Yoder

(10) Patent No.: US 12,808,544 B2
(45) Date of Patent: Nov. 24, 2026

(54) GRILLING APPARATUS

(71) Applicant: Eran Yoder, Paris, TX (US)

(72) Inventor: Eran Yoder, Paris, TX (US)

( * ) Notice: Subject to any disclaimer, the term of this patent is extended or adjusted under 35 U.S.C. 154(b) by 305 days.

(21) Appl. No.: 18/638,054

(22) Filed: Apr. 17, 2024

(65) Prior Publication Data

US 2025/0327579 A1 Oct. 23, 2025

(51) Int. Cl.

*A47J 37/07* (2006.01)
*F24C 3/02* (2021.01)
*F24C 3/12* (2006.01)

(52) U.S. Cl.

CPC ........... *F24C 3/027* (2013.01); *A47J 37/0763* (2013.01); *F24C 3/126* (2013.01)

(58) Field of Classification Search

CPC ........ F24C 3/027; F24C 3/126; A47J 37/0763
USPC ........................................................ 126/25 R
See application file for complete search history.

(56) References Cited

U.S. PATENT DOCUMENTS

2007/0163568 A1* 7/2007 Murray .................. F24C 3/027 126/41 R
2016/0029841 A1 2/2016 Walker
2017/0273503 A1 9/2017 Schuitemaker
2019/0075968 A1* 3/2019 Koehn ................ A47J 37/0713
2019/0099041 A1* 4/2019 Figueroa ............. A47J 37/0763
2024/0011641 A1* 1/2024 Hou ........................ F24C 3/128

* cited by examiner

*Primary Examiner* — Avinash A Savani
(74) *Attorney, Agent, or Firm* — Dale J. Ream

(57) ABSTRACT

A grilling apparatus includes a housing having walls that, together, define an interior area. A gas reservoir containing propane or kerosene gas is situated in the interior area. Further, multiple heating devices are positioned at predetermined locations within the interior area, each being in fluid communication with the gas reservoir and positioned so as to heat predetermined grilling stations. The heating devices are positioned at predetermined locations beneath the grilling stations. The grilling apparatus includes a plurality of valves coupled to piping intermediate the heating devices and the gas reservoir, respectively. Therefore, each heating device is independently operable via the valves. A grilling assembly is situated atop the housing that includes a flat grilling surface having both a planar and a circular configuration, the circular grilling surface defining a peripheral edge having an upstanding guardrail so that food never falls from the grill surface.

18 Claims, 4 Drawing Sheets

GRILLING APPARATUS

BACKGROUND OF THE INVENTION

This invention relates generally to outdoor food preparation and, more particularly, an outdoor grilling apparatus that includes a large-diameter circular grilling surface that defines multiple grilling stations each providing a predetermined temperature such that food items requiring different cooking temperatures may be grilled simultaneously, respectively.

Family and friends, corporate groups, and even community organizations find something magical about the sizzle of burgers, the aroma of hot dogs, and the smoky embrace of outdoor grilling. An outdoor grilling experience becomes a celebration of both flavor and fellowship. While burgers, with their juicy interiors and charred exteriors, epitomize the perfect grill creation and require high heat, one of the unique aspects of outdoor grilling is the ability to cater to a variety of tastes. For example, hot dogs benefit from a more moderate heat to provide another choice. Grilling, however, is not limited to just burgers and hotdogs. The versatility of an outdoor grill should allow for a culinary adventure and, more particularly, to grilling vegetables, pancakes, eggs, potatoes, spices, and other favorites.

One of the critical elements of successful grilling is understanding and controlling temperatures. Each dish has its own ideal cooking temperature, and mastering this art can transform traditional grilling into a gourmet kitchen experience. Experimenting with different temperatures can unlock a world of possibilities. Lower temperatures are ideal for slow-cooking ribs or brisket, allowing the flavors to develop and the need to become tender and succulent. Higher temperatures, simulating a wok, and turning a medley of vegetables into a vibrant stir-fry, showcasing the grill's versatility beyond traditional barbecue fare.

While a well-equipped kitchen may have multiple cooking surfaces that may be actuated simultaneously so as to cook multiple food items, a single grill is traditionally unable to cook at different temperatures simultaneously and, as a result, is ill-equipped to cook a wide variety of food items simultaneously for a large group that desire to eat the wide variety of food at a single meal. Therefore, it would be desirable to have a grilling apparatus having a circular configuration and having a flat and circular grilling surface that defines multiple distinct grilling stations each of which is heated to a different temperature so that food items requiring different temperatures can be grilled simultaneously. In which each grilling station can be controlled independently using dedicated valves configured to opened or closed access to combustible gas. In addition, it would be desirable to have a grilling apparatus having an outstanding grill guard forming a raised ring or lip around a peripheral edge of the circular grill surface that prevents grill food items from falling inadvertently off of the grill cooking surface.

SUMMARY OF THE INVENTION

Therefore, a grilling apparatus according to the present invention includes a housing having a plurality of walls that, together, define an interior area. A gas reservoir or tank is situated in the interior area and may be filled and refilled with propane or kerosene gas. Further, a plurality of heating devices may be distributed to predetermined locations within the interior area, each being in fluid communication with the gas reservoir and positioned so as to heat predetermined grilling stations. The heating devices are positioned at predetermined locations beneath the grilling stations.

In a critical aspect, the grilling apparatus includes a plurality of valves coupled to the piping that is intermediate the plurality of heating devices and the gas reservoir, respectively. Therefore, each heating device is independently operable via the valves. A grilling assembly is situated atop the housing that includes a flat grilling surface having both a planar and a circular configuration, the circular grilling surface defining a peripheral edge having an upstanding guardrail so that food never falls from the grill surface.

Therefore, a general object of this invention is to provide a grilling apparatus having a large, circular grilling surface that includes multiple grilling stations each providing a predetermined temperature for grilling multiple types of food products simultaneously that, correspondingly, require different temperatures.

Another object of this invention is to provide a grilling apparatus, as aforesaid, in which the circular grilling surface can also be used as a serving platter that is able to accommodate a large crowd helping themselves to the various grill food items simultaneously.

Still another object of this invention is to provide a grilling apparatus, as aforesaid, having a plurality of valves configured so that an operator can independently actuate the flow of combustible gas to the grilling stations.

Another object of this invention is to provide a grilling apparatus, as aforesaid, in which the circular grilling surface rotatable about its horizontal plane for providing an even more efficient serving platter.

Yet another object of this invention is to provide a grilling apparatus, as aforesaid, that includes a circular and upstanding guardrail that prevents grilled food from inadvertently falling from the grilling surface.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1A:
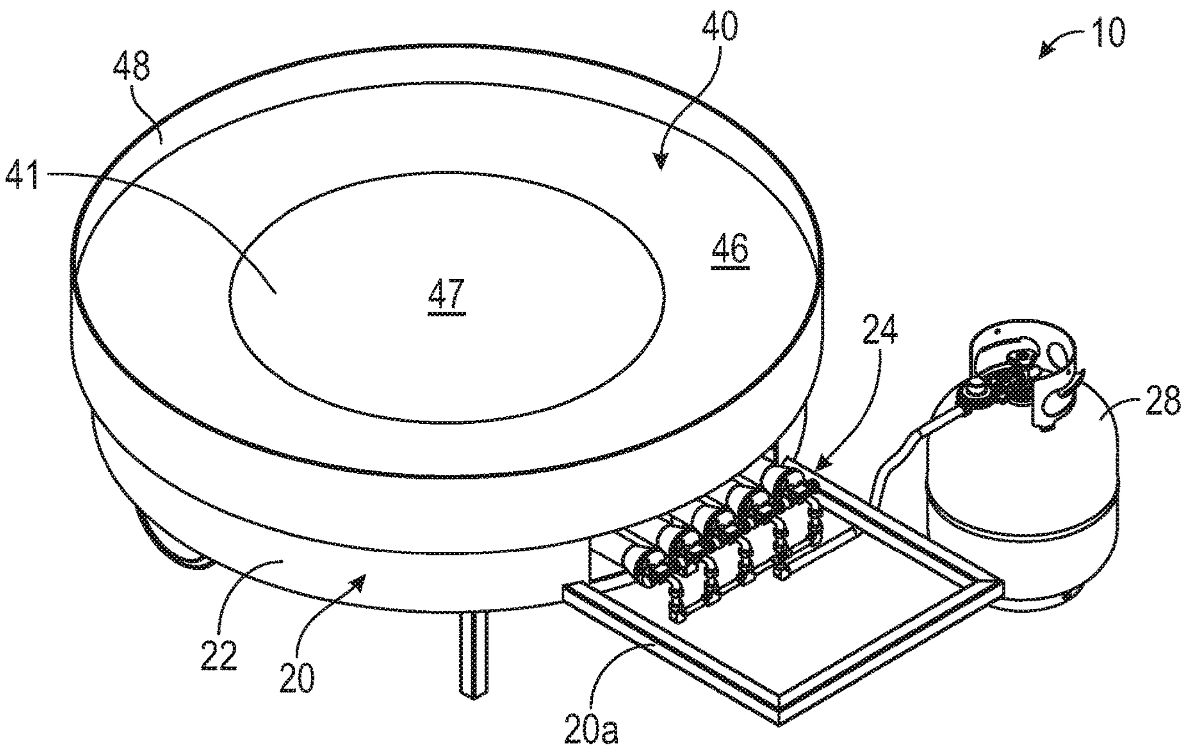
FIG. 1*a* is a perspective view of a grilling apparatus according to a preferred embodiment of the present invention.

A grilling apparatus according to a preferred embodiment of the present invention will now be described with reference to the accompanying drawings. The grilling apparatus 10 includes a body assembly 20 and a grilling assembly 40 positioned atop the body assembly 20, both assemblies having multiple additional components that will be described below.

The body assembly 20 includes a housing 22 that, in an embodiment, includes a continuous outer wall 23 (also referred to as a circular outer wall or a peripheral outer wall). The outer wall 23 defines an interior area in which other components may be positioned as will be described later. It is understood that the continuous outer wall 23 may be comprised of multiple wall segments having a square, rectangular, or other configuration that, together, define the interior area.

In a critical aspect, the body assembly 20 may include a plurality of valves 24 and an array of piping 25 positioned in the interior area and that are each in operative fluid communication with a reservoir 28 of combustible gas such as, for example, propane, butane, natural gas, or kerosene. While kerosene burns hotter than propane and, in fact, may be more cost-effective, kerosene may cause more toxic fumes to be created and, for that reason, may not be preferred. In the present invention, the reservoir 28 may be a 5- or 10-gallon tank of gaseous fuel positioned outside the interior area of the body assembly 20 and is preferably refillable or replaceable. In an embodiment, a smaller reservoir may be positioned or mounted inside the interior area of the body assembly 20. One end of the piping 25 may be coupled in fluid communication with this reservoir 28 and, more particularly, there may be an interface device (e.g., a regulator) that may provide this coupling as would be understood by one of ordinary skill in the art. In an embodiment, each valve 24 may be a rotary knob (referred to generically as an input knob) configured to control a quantity of gas allowed to flow from the reservoir 28 to a respective heating device 30 may be a literal on/off switch. In an embodiment, the body assembly 20 may include a rack 20*a* or framework upon which the piping 25 and valves 24 may be supported or coupled. In an embodiment, the rack 20*a* may be mounted on rails or other mechanism by which it may be slidably inserted or extended relative to the interior area defined by the housing 22.

Further, the body assembly 20 may include a plurality of heating devices 30, each heating device 30 being operatively coupled to an end of a respective pipe of the array of piping 25. Preferably, each heating device 30 is mounted and positioned immediately or proximally beneath the cooking surface (to be described later) and may be actuated to a predetermined temperature. In an embodiment, each heating device 30 may be in the form of a propane camping stove and, depending on configuration or the type of gas in the reservoir 28, a heating device 30 may heat up a respective grilling station 45 to a predetermined temperature. In an embodiment, each heating device 30 is a burner having an elongate configuration, i.e., the heating device 30 may extend substantially an entire length of a grilling station, respectively.

Figure 1B:
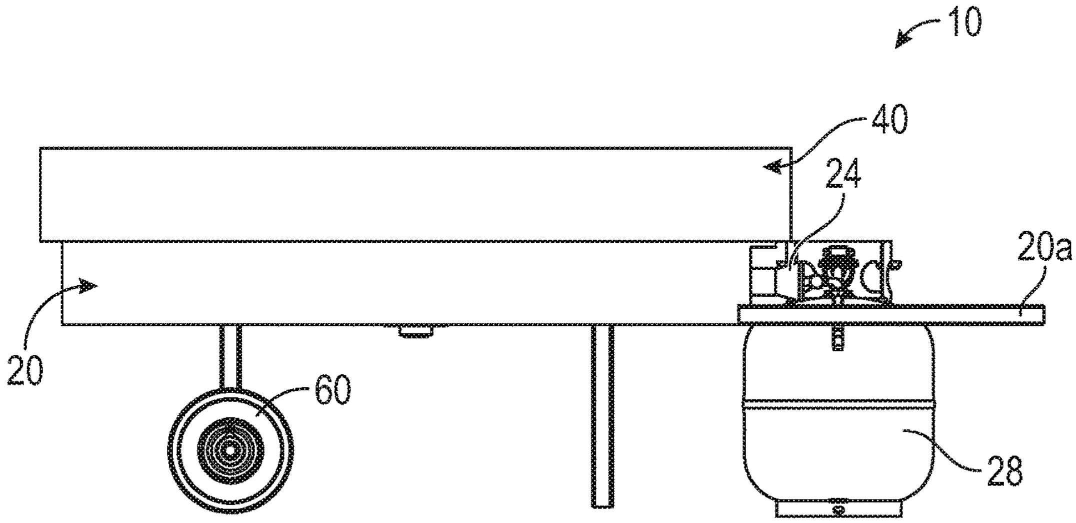
FIG. 1*b* is a side view of the grilling apparatus as in FIG. 1*a;*
Figure 4A:
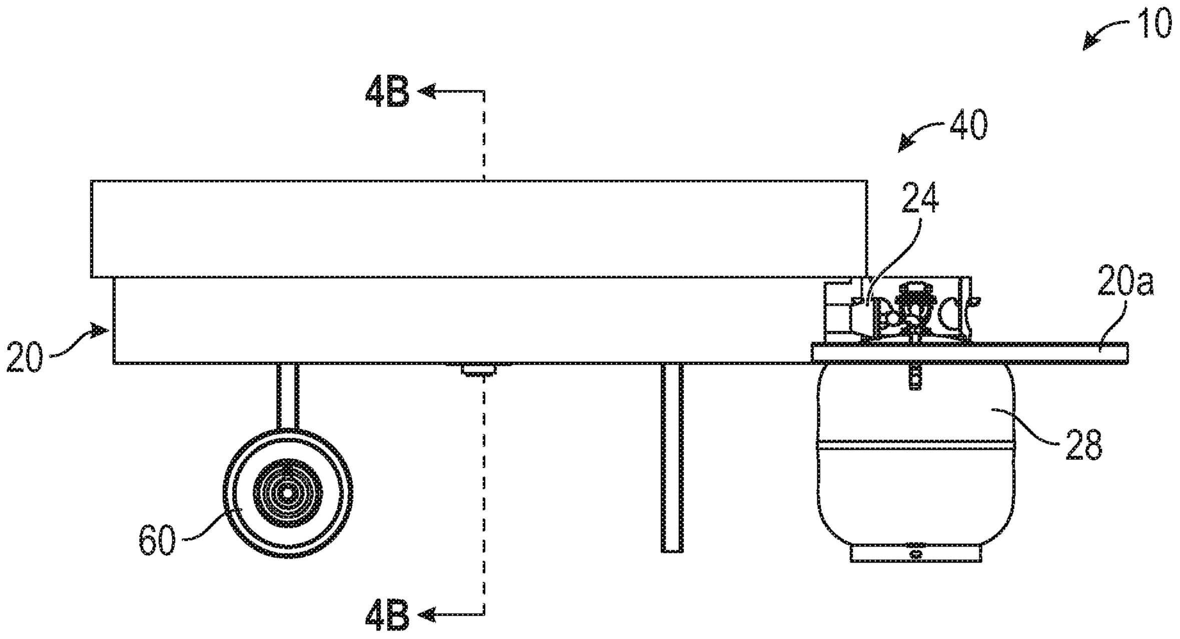
FIG. 4*a* is another side view of the grilling apparatus as in FIG. 1*a*.
Figure 4B:
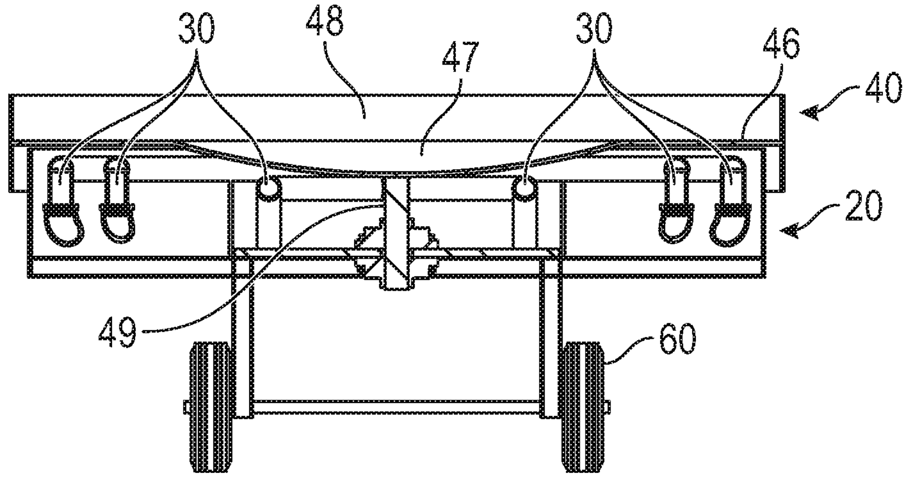
FIG. 4*b* is a sectional view taken along line 4*b*-4*b* of FIG. 4*a*.

Preferably, the entire grilling assembly 40 may be situated atop the body assembly 20 (FIG. 1). In a preferred embodiment, the housing 22 of the body assembly 20 may include an upstanding central rod or shaft to which the grilling surface 41 is rotatably coupled with a hub or ball bearings (FIG. 4*b*). More particularly, the grilling surface 41 may be rotatable 360° about the horizontal plane defined thereby as further described later. The grilling assembly 20 includes a grilling surface 41 (also referred to as a cooking surface) that may also have a circular and generally flat (planar) configuration. It is understood that the grilling surface 41 is positioned directly atop and, therefore, adjacent the interior area of the body assembly 20 where the plurality of heating devices 30 is positioned. Accordingly, when respective heating devices 30 are energized, the resulting heat is imparted to the corresponding grilling surface 41. Accordingly, the heating devices 30 may be specifically positioned such that the grilling surface 41 includes or defines multiple grilling stations 45. Reference will be made to specific grilling stations later. The grilling surface 41 may have a circular configuration that defines a mathematical diameter such that the entire grilling surface 41 is able to be heated and used for grilling food products.

The grilling surface 41—having a circular configuration and being oriented so as to create a horizontal plane—has a peripheral edge. Then, in a critical aspect, the grilling apparatus 10 includes a grill guard 48 having a lower edge fixedly attached to the peripheral edge and extending upwardly. In an embodiment, the lower edge of the grill guard 48 may be coupled to the peripheral edge by welding or as may be molded. Preferably, the grill guard 48 is geometrically perpendicular to the horizontal plane defined by the grilling surface 41. Further, the grill guard 48 may extend upwardly 2 to 4 inches or the like so as not to be an obstacle to a person grilling food items on the grilling surface 41 but still preventing food items from inadvertently falling or being swept off the grilling surface 41 and onto the ground.

Figure 2:
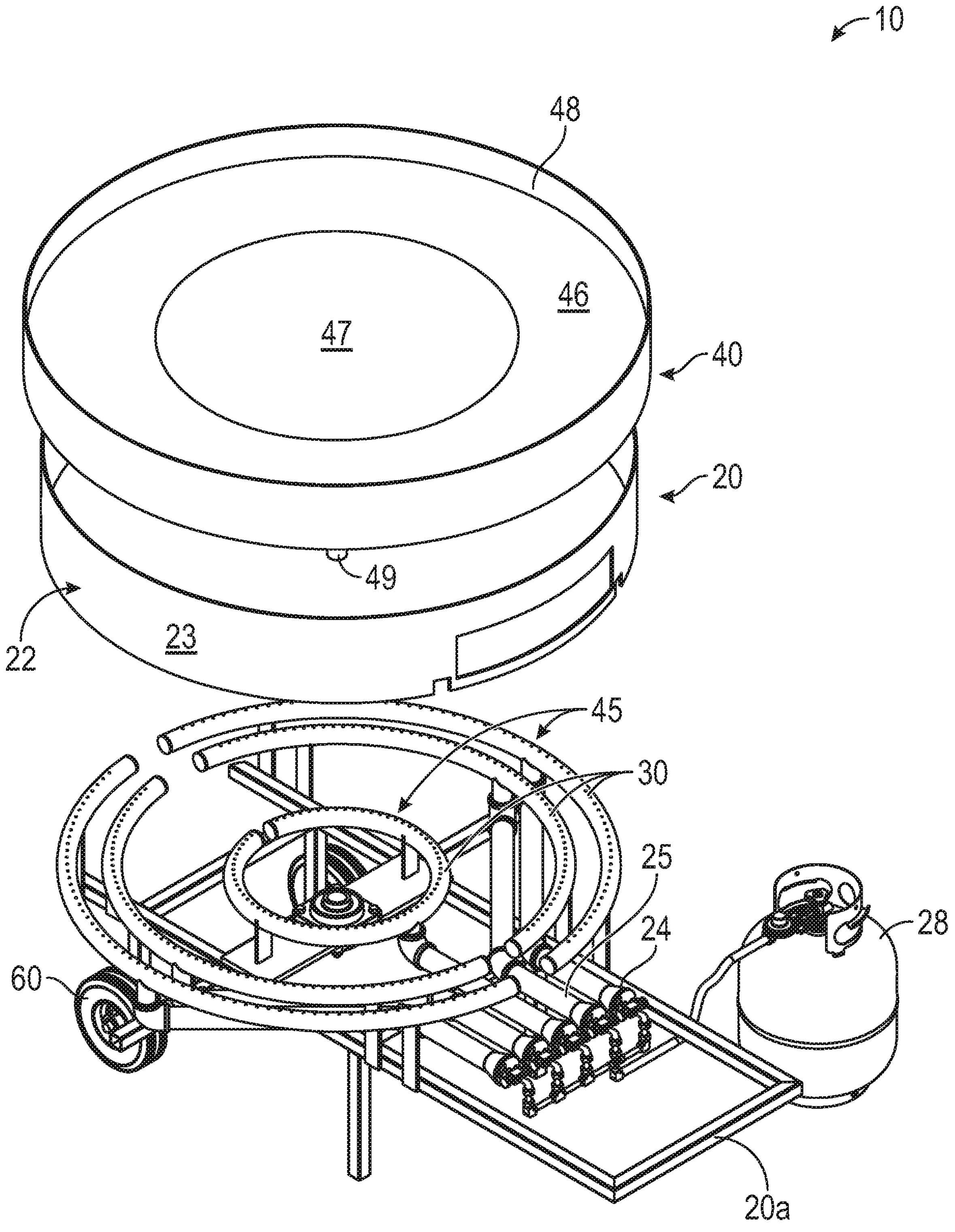
FIG. 2 is an exploded view of the grilling apparatus as in FIG. 1*a;*
Figure 3:
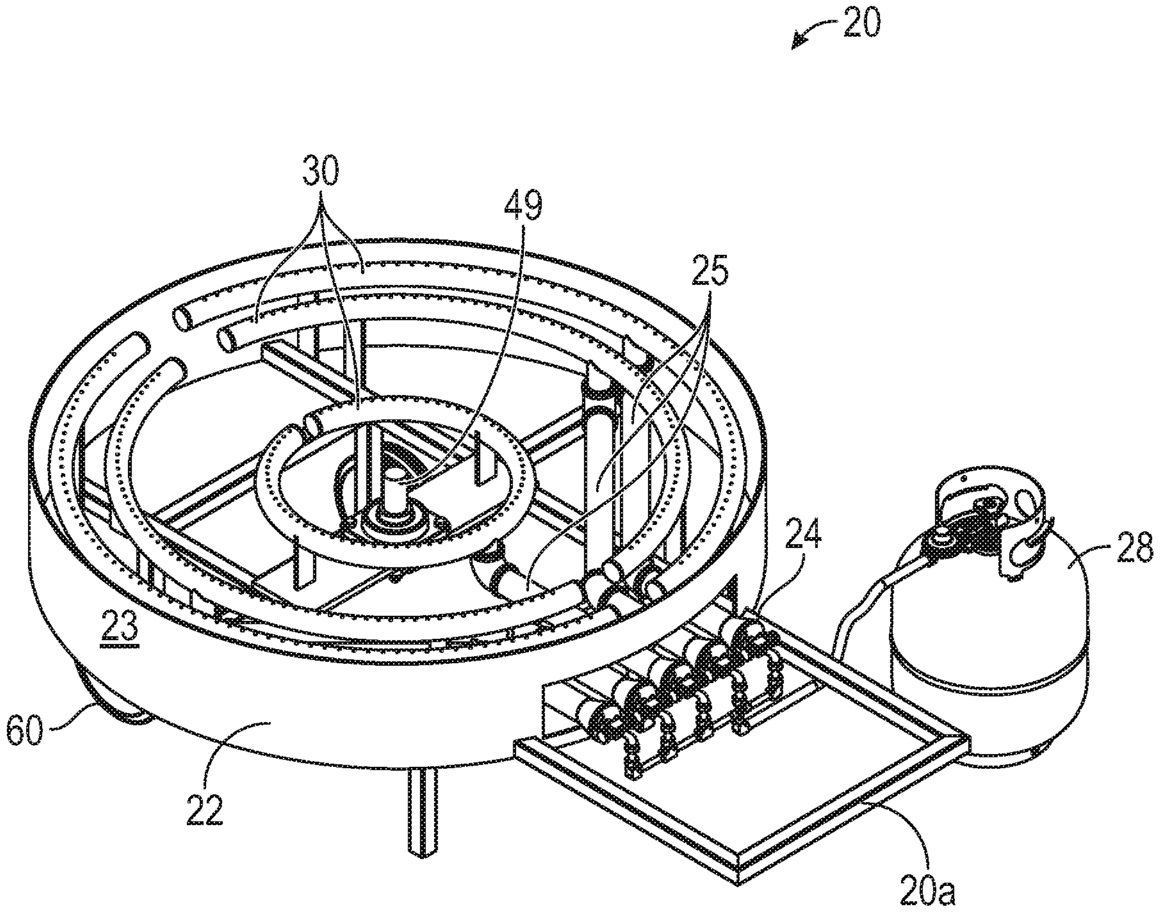
FIG. 3 is a perspective view of the body portion of the grilling apparatus as in FIG. 1*a;*

Now with further description of the grilling stations, the grilling surface 41 may define a first grilling station 46 in a manner that forms a ring inwardly adjacent the grill guard 48. In an embodiment, the first grilling station 46 may extend inwardly from the grill guard 48 about 12 to 24 inches (FIG. 1). Preferably, a plurality of heating devices 30 are positioned in the interior area beneath and adjacent the first grilling station 46 so as to impart high heat thereto when actuated (i.e., when corresponding valves 24 are opened). As shown in FIGS. 2 and 3, the first grilling station 46 may actually be two or more grilling stations each corresponding to respective heating devices 30 that will provide a lesser degree of heat when actuated (FIG. 2). In this embodiment, food products requiring lower temperatures may be cooked appropriately.

In a critical aspect, the grilling surface 41 provides or defines a second grilling station 47 in the area extending along an imaginary geometric diameter that is formed naturally by the circular configuration of the grilling surface 41 and ring of the first grilling station 46. Stated another way, the second grilling station 47 comprises the entire center area of the grilling surface not including the first grilling station 46. In an embodiment, the second grilling station 47 may include a dish-shaped or concave configuration (FIG. 4*b*). Accordingly, one or a plurality of heating devices 30 may be positioned in the interior area immediately beneath the second grilling station 47 and actuated to impart a predetermined temperature thereto. In an embodiment, this section may be referred to as a wok and may be correspondingly heated so as to steam or sear vegetables, cook stir-fry mixes, rice, bacon, pork chunks, or the like. To summarize, the multiple heating devices 30 and multiple grilling stations may be heated to differing temperatures so that various food products may be grilled more accurately and simultaneously.

In another aspect, the body assembly 20 and, therefore, the entire grilling apparatus 10 may be portable and movable. More particularly, a wheel assembly 60 may be operably coupled to a bottom surface of the body assembly 20 such that the grilling apparatus 10 may be pulled behind an automobile or may be rolled to a desired location when grilling is to be done on site such as at a residence, commercial building, a park, or other community or family gathering.

In use, the unique grilling apparatus 10 described above may still be easily transported to remote locations where it is desired to be used for grilling food products. For example, a caterer may be retained to provide an outdoor style meal to employees or a family reunion where multiple food products need to be efficiently prepared independently and simultaneously to the large group. In such an instance, the grilling apparatus 10 may be pulled or transported in a truck bed to the location of the gathering where multiple food products may be independently grilled on the various grilling stations as described above. It is understood, of course, that corresponding valves 24 will be opened and closed so as to actuate the specific grilling stations corresponding to the location on the grilling surface on which each type of the product is being grilled. Finally, the circular configuration of the grilling surface 41 allows the crowd to serve themselves directly from the grill or for the catering staff to efficiently collect the food products from a singular location for distribution.

It is understood that while certain forms of this invention have been illustrated and described, it is not limited thereto except insofar as such limitations are included in the following claims and allowable functional equivalents thereof.

The invention claimed is:

1. A grilling apparatus, comprising:

a body assembly that includes (1) a housing having a wall that is configured to define an interior area and (2) a plurality of valves situated in said interior area each being independently and operatively connected to a gas reservoir via piping, and (3) a plurality of heating devices mounted in said interior area each being in fluid communication with a respective valve via respective piping, each heating device being configured to generate heat when actuated;

a grilling assembly situated atop said body assembly that includes a grilling surface having a planar and circular configuration and a peripheral edge, said plurality of heating devices being positioned at predetermined locations immediately beneath and adjacent a plurality of grilling stations defined by said grilling surface, respectively; and a grill guard coupled to an entirety of said peripheral edge and extending upwardly therefrom;

wherein said plurality of grilling stations includes a first grilling station forming a ring inwardly adjacent to said grill guard.

2. The grilling apparatus as in claim 1, wherein said grill guard is a rail that is perpendicular to said grilling surface.

3. The grilling apparatus as in claim 1, wherein said plurality of grilling stations includes a second grilling station extending along an imaginary geometric diameter formed by said ring but not including said first grilling station.

4. The grilling apparatus as in claim 3, wherein said second grilling station is a wok.

5. The grilling apparatus as in claim 1, wherein said first grilling station includes a plurality of grilling stations each being heated to a different temperature by said plurality of heating devices, respectively.

6. The grilling apparatus as in claim 1, wherein said housing includes a mounting rod extending upwardly, said grilling surface being rotatably coupled to said mounting rod and configured for 360° rotation about said mounting rod.

7. The grilling apparatus as in claim 5, wherein each said valve includes an input knob for selectively opening or closing said respective piping.

8. The grilling apparatus as in claim 1, wherein:

said gas reservoir is filled with propane or kerosene; and each said heating device is a gas actuated cooking device in fluid communication with said gas reservoir.

9. The grilling apparatus as in claim 1, further comprising a wheel assembly operatively coupled to said body assembly.

10. A grilling apparatus, comprising:

a housing having a plurality of walls that, together, define an interior area;

a gas reservoir situated in said interior area;

a plurality of heating devices mounted in said interior area each being in fluid communication with the gas reservoir via piping, each heating device being configured to generate heat when actuated;

a grilling assembly rotatably mounted atop said housing that includes a planar grilling surface having a planar and circular configuration and a continuous peripheral edge, said plurality of heating devices being positioned at predetermined locations immediately beneath and corresponding to a plurality of grilling stations defined by said grilling surface, respectively; and a grill guard coupled to said peripheral edge and extending 360 degrees thereabout and extending upwardly therefrom;

wherein said plurality of grilling stations includes a first grilling station defining a continuous ring inwardly adjacent to said grill guard.

11. The grilling apparatus as in claim 10, further comprising a plurality of valves operatively coupled to said piping intermediate said gas reservoir and said plurality of heating devices, respectively, each valve being independently operable to regulate gas flowing between said gas reservoir and a corresponding heating device.

12. The grilling apparatus as in claim 11, wherein said heating device is configured to generate heat to a predetermined temperature when a corresponding valve is open.

13. The grilling apparatus as in claim 10, wherein said grill guard is a rail that is perpendicular to said grilling surface.

14. The grilling apparatus as in claim 10, wherein said plurality of grilling stations includes a second grilling station extending along an imaginary geometric diameter defined by said continuous ring but not including any portion of said first grilling station.

15. The grilling apparatus as in claim 14, wherein said second grilling station is a wok.

16. The grilling apparatus as in claim 11, wherein each said valve includes an input control for selectively opening or closing said respective piping.

17. The grilling apparatus as in claim 10, wherein:

said gas reservoir is refillable with either propane or kerosene; and each said heating device is a gas actuated cooking device in fluid communication with said gas reservoir.

18. The grilling apparatus as in claim 10, further comprising a wheel assembly operatively coupled to said body assembly.

* * * * *